US010773495B2

(12) United States Patent
Brown et al.

(10) Patent No.: US 10,773,495 B2
(45) Date of Patent: Sep. 15, 2020

(54) MODULAR WALL PANELS AND PLANAR STRUCTURES

(71) Applicant: CORNING INCORPORATED, Corning, NY (US)

(72) Inventors: Gordon Charles Brown, Rock Stream, NY (US); Thomas Michael Cleary, Elmira, NY (US); Joan Deanna Gregorski, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 219 days.

(21) Appl. No.: 15/994,500

(22) Filed: May 31, 2018

(65) Prior Publication Data

US 2018/0272659 A1    Sep. 27, 2018

Related U.S. Application Data

(63) Continuation of application No. 14/907,926, filed as application No. PCT/US2014/047724 on Jul. 23, 2014, now Pat. No. 10,011,094.

(Continued)

(51) Int. Cl.
*B32B 17/06* (2006.01)
*B32B 17/10* (2006.01)
(Continued)

(52) U.S. Cl.
CPC ...... *B32B 17/064* (2013.01); *B32B 17/10018* (2013.01); *B32B 17/10036* (2013.01);
(Continued)

(58) Field of Classification Search
CPC ....................................................... B32B 17/06
(Continued)

(56) References Cited

U.S. PATENT DOCUMENTS

| 4,571,446 A | 2/1986 | Yamazaki |
| 6,352,322 B1 | 3/2002 | Nakao |

(Continued)

FOREIGN PATENT DOCUMENTS

| AT | 218187 | 11/1961 |
| AT | 218187 B * | 11/1961 |

(Continued)

OTHER PUBLICATIONS

English Translation of JP2016531756 Office Action Dated March 6, 2019; 3 pages; Japanese Office Patent.

(Continued)

*Primary Examiner* — Brent T O'Hern (57) ABSTRACT

A modular glass panel comprising a glass structure having at least one thin glass sheet having a thickness ranging from about 0.5 mm to about 2.0 mm, a backing frame positioned adjacent the glass structure and situated along the perimeter of the glass structure, and a polymer layer intermediate the glass structure and backing frame to adhere the glass structure together with the backing frame. The glass structure can further comprise the at least one thin glass sheet and a second glass sheet having a polymer interlayer therebetween. The backing frame generally has a geometric cross-section with a rounded interior edge adjacent the glass structure to prevent breakage of the structure upon loading or impact of an exterior surface of the structure.

20 Claims, 5 Drawing Sheets

Related U.S. Application Data (60) Provisional application No. 61/860,539, filed on Jul. 31, 2013.

(51) Int. Cl.
*E04B 2/72* (2006.01)
*E04B 9/04* (2006.01)
*E04B 9/32* (2006.01)
*E04F 13/077* (2006.01)
*A47B 96/20* (2006.01)

(52) U.S. Cl.
CPC .... *B32B 17/10064* (2013.01); *B32B 17/1077* (2013.01); *B32B 17/10137* (2013.01); *B32B 17/10247* (2013.01); *B32B 17/10293* (2013.01); *B32B 17/10541* (2013.01); *B32B 17/10743* (2013.01); *B32B 17/10761* (2013.01); *B32B 17/10779* (2013.01); *B32B 17/10788* (2013.01); *E04B 2/72* (2013.01); *E04B 9/045* (2013.01); *E04B 9/32* (2013.01); *E04F 13/077* (2013.01); *A47B 96/20* (2013.01); *B32B 2329/06* (2013.01); *B32B 2331/04* (2013.01); *B32B 2367/00* (2013.01); *B32B 2375/00* (2013.01); *B32B 2607/02* (2013.01)

(58) Field of Classification Search
USPC .......................................................... 428/38
See application file for complete search history.

(56) References Cited

U.S. PATENT DOCUMENTS

| | | | |
|---|---|---|---|
| 6,631,589 B1 | 10/2003 | Friedman et al. | |
| 7,016,817 B2 | 3/2006 | Friedman et al. | |
| 7,089,708 B1 | 8/2006 | Bostock | |
| 7,305,329 B2 | 12/2007 | Friedman | |
| 8,389,120 B2 | 3/2013 | Delatte | |

FOREIGN PATENT DOCUMENTS

| | | | | |
|---|---|---|---|---|
| DE | 19616490 A1 | 10/1997 | | |
| DE | 10105329 A1 | 8/2002 | | |
| DE | 102004022008 A1 | 12/2004 | | |
| DE | 102006042538 A1 * | 3/2008 | ....... | B32B 17/10036 |
| DE | 102006042538 A1 | 3/2008 | | |
| JP | 48-815 A | 1/1973 | | |
| JP | 48-60332 A | 8/1973 | | |
| JP | 57051515 A | 3/1982 | | |
| JP | 5825041 A | 2/1983 | | |
| JP | 7323504 A | 12/1995 | | |
| JP | 08050282 A * | 2/1996 | | |
| JP | 2002162503 A | 6/2002 | | |
| JP | 2006113183 A | 4/2006 | | |
| JP | 2010138025 A | 6/2010 | | |
| JP | 2012199284 A | 10/2012 | | |
| JP | 2012247484 A | 12/2012 | | |
| WO | 2001038088 A1 | 5/2001 | | |
| WO | 2012029347 A1 | 3/2012 | | |

OTHER PUBLICATIONS

English Translation of JP2016531756 Office Action Dated Jul. 3, 2018, Japan Patent Office.

International Search Report and Written Opinion of the International Searching Authority; PCT/US2014/047724 dated Nov. 3, 2014; 13 pages; European Patent Office.

* cited by examiner

MODULAR WALL PANELS AND PLANAR STRUCTURES

This application is a Continuation of U.S. application Ser. No. 14/907,926, filed on Jan. 27, 2016, which claims the benefit of priority under 35 U.S.C. § 365 of International Patent Application Serial No. PCT/US14/47724 filed on Jul. 23, 2014, and also claims the benefit of priority to U.S. Provisional Application 61/860,539 filed Jul. 31, 2013, the content of which are incorporated herein by reference in their entirety.

BACKGROUND

In conventional elevators, lobbies and other interior architectural environments, glass can be utilized as a wall covering or as the wall. In such environments, soda lime glass or tempered monolithic glass is utilized having thicknesses greater than about 6 mm. Laminated glass structures are also employed in such settings with multiple glass layers, each layer also having thicknesses greater than about 6 mm and resulting in an overall laminate glass structure thickness of over 12 mm or more. Furthermore, conventional decoration can employ soda lime glass or tempered monolithic glass mounted over wood, stone or another decorative surface or substrate. Notably, the weight of such wall coverings and/or glass paneling is rather heavy and on the order of approximately five to ten pounds per square foot. Additionally, such thick glass or glass laminate structures combined with an underlying wood, stone or other substrate greatly increases the weight of the overall wall covering or panel.

In an elevator environment, weight is a notable issue where the trend has been towards lighter elevator cabs. Light-weight elevator cabs, however, generally reduce the load on a respective elevator motor and can allow for installation of smaller motors. Conventionally, this weight issue has been addressed by reducing weight in the elevator cab body and elevator cab framework. This solution, however, has failed to address weight savings provided by interior components of the elevator cab.

SUMMARY

The present disclosure generally relates to interior architectural elements and the design and manufacture of light-weight, modular, reconfigurable glass panels.

Embodiments of the present disclosure can include a modular glass panel comprising a glass structure having at least one thin glass sheet having a thickness ranging from about 0.5 mm to about 2.0 mm or more, a backing frame positioned adjacent the glass structure and situated along the perimeter of the glass structure, and a polymer layer intermediate the glass structure and backing frame to adhere the glass structure together with the backing frame.

Additional embodiments of the present disclosure include a modular panel comprising a planar structure, a backing frame positioned adjacent the planar structure and situated along the perimeter of the planar structure, the backing frame have a geometric cross-section with a rounded interior edge adjacent the planar structure to prevent breakage of the planar structure upon loading or impact of an exterior surface of the planar structure, and a polymer layer intermediate the planar structure and backing frame to adhere the planar structure together with the backing frame.

Additional features and advantages of the claimed subject matter will be set forth in the detailed description which follows, and in part will be readily apparent to those skilled in the art from that description or recognized by practicing the claimed subject matter as described herein, including the detailed description which follows, the claims, as well as the appended drawings.

It is to be understood that both the foregoing general description and the following detailed description present embodiments of the present disclosure, and are intended to provide an overview or framework for understanding the nature and character of the claimed subject matter. The accompanying drawings are included to provide a further understanding of the present disclosure, and are incorporated into and constitute a part of this specification. The drawings illustrate various embodiments and together with the description serve to explain the principles and operations of the claimed subject matter.

BRIEF DESCRIPTION OF THE DRAWINGS

For the purposes of illustration, there are forms shown in the drawings that are presently preferred, it being understood, however, that the embodiments disclosed and discussed herein are not limited to the precise arrangements and instrumentalities shown.

DETAILED DESCRIPTION

With reference to the figures, where like elements have been given like numerical designations to facilitate an understanding of the present disclosure, the various embodiments for modular wall panels and planar structures are described.

In the following description, like reference characters designate like or corresponding parts throughout the several views shown in the figures. It is also understood that, unless otherwise specified, terms such as "top," "bottom," "outward," "inward," and the like are words of convenience and are not to be construed as limiting terms. In addition, whenever a group is described as comprising at least one of a group of elements and combinations thereof, it is understood that the group may comprise, consist essentially of, or consist of any number of those elements recited, either individually or in combination with each other.

Similarly, whenever a group is described as consisting of at least one of a group of elements or combinations thereof, it is understood that the group may consist of any number of those elements recited, either individually or in combination with each other. Unless otherwise specified, a range of values, when recited, includes both the upper and lower limits of the range. As used herein, the indefinite articles "a," and "an," and the corresponding definite article "the" mean "at least one" or "one or more," unless otherwise specified The following description of the present disclosure is provided as an enabling teaching thereof and its best, currently-known embodiment. Those skilled in the art will recognize that many changes can be made to the embodiment described herein while still obtaining the beneficial results of the present disclosure. It will also be apparent that some of the desired benefits of the present disclosure can be obtained by selecting some of the features of the present disclosure without utilizing other features. Accordingly, those of ordinary skill in the art will recognize that many modifications and adaptations of the present disclosure are possible and can even be desirable in certain circumstances and are part of the present disclosure. Thus, the following description is provided as illustrative of the principles of the present disclosure and not in limitation thereof.

Those skilled in the art will appreciate that many modifications to the exemplary embodiments described herein are possible without departing from the spirit and scope of the present disclosure. Thus, the description is not intended and should not be construed to be limited to the examples given but should be granted the full breadth of protection afforded by the appended claims and equivalents thereto. In addition, it is possible to use some of the features of the present disclosure without the corresponding use of other features. Accordingly, the foregoing description of exemplary or illustrative embodiments is provided for the purpose of illustrating the principles of the present disclosure and not in limitation thereof and can include modification thereto and permutations thereof.

In some embodiments of the present disclosure, thin sheets of glass can be employed as a surface mount on exemplary backing devices or frames or can be employed as single sheets or as laminate structures without backing devices or frames, or as combinations thereof. Such a structure may generally be referred to as a panel. Exemplary glass sheets can be formed from chemically-strengthened glass, thermal tempered glass, heat strengthened glass, annealed glass, soda lime glass, and glass ceramics, just to name a few. Additionally, embodiments of the present disclosure can employ exemplary polymers or plastics in the place of glass sheets. Exemplary polymeric materials include, but are not limited to, polyvinyl butryal (PVB), ethylene vinyl acetate (EVA), SentryGlass® or other ionomers, polycarbonate, acrylic, and the like. Exemplary glass or polymeric panels can be suitable for a myriad of interior or exterior environments such as, but not limited to, elevators, walls, standalone walls (as in partitions), office spaces, lab spaces, entry ways, and the like.

In additional embodiments of the present disclosure, thin chemically strengthened glass, e.g., Gorilla® Glass, can be employed over a decorative element, or with an integrated decorative element, to provide a light-weight solution to architectural requirements while providing benefits of durability and scratch and damage resistant surfaces to the underlying decoration. Applicant has discovered that by replacing conventionally employed glass products with thin, chemically-strengthened glass the weight of the respective device or panel is reduced by at least 50% without compromising the safety or impact performance of the device or panel. Additionally, by employing such light-weight and thin glass elements, touch functionality and wireless communication functionality can be employed in embodiments of the present disclosure. For example, the Corning ONE Wireless platform can be utilized with embodiments of the present disclosure as described below. Of course, other distributed wireless or antenna systems can be employed to gather and/or disseminate information to other devices within a space or exterior to a space such as handheld devices, smartphones and the like for purposes of freely sharing information (information way points) or as points of sale (POS). Additionally, wireless sensor networks (WSN) for environmental monitoring feedback and control, can also be employed with embodiments of the present disclosure.

Suitable glass sheets used in embodiments of the present disclosure, whether in a single glass sheet embodiment or in a multi-layer glass sheet embodiment and used as an external and/or internal glass sheet, can be strengthened or chemically-strengthened by a pre- or post-ion exchange process. In this process, typically by immersion of the glass sheet into a molten salt bath for a predetermined period of time, ions at or near the surface of the glass sheet are exchanged for larger metal ions from the salt bath. In one embodiment, the temperature of the molten salt bath is about 430° C. and the predetermined time period is about eight hours. The incorporation of the larger ions into the glass strengthens the sheet by creating a compressive stress in a near surface region. A corresponding tensile stress is induced within a central region of the glass to balance the compressive stress.

Exemplary ion-exchangeable glasses that are suitable for forming glass sheets or glass laminates can be alkali aluminosilicate glasses or alkali aluminoborosilicate glasses, though other glass compositions are contemplated. As used herein, "ion exchangeable" means that a glass is capable of exchanging cations located at or near the surface of the glass with cations of the same valence that are either larger or smaller in size. One exemplary glass composition comprises $SiO_2$, $B_2O_3$ and $Na_2O$, where $(SiO_2+B_2O_3) \geq 66$ mol. %, and $Na_2O \geq 9$ mol. %. In an embodiment, the glass sheets include at least 6 wt. % aluminum oxide. In a further embodiment, a glass sheet includes one or more alkaline earth oxides, such that a content of alkaline earth oxides is at least 5 wt. %. Suitable glass compositions, in some embodiments, further comprise at least one of $K_2O$, MgO, and CaO. In a particular embodiment, the glass can comprise 61-75 mol. % $SiO_2$; 7-15 mol. % $Al_2O_3$; 0-12 mol. % $B_2O_3$; 9-21 mol. % $Na_2O$; 0-4 mol. % $K_2O$; 0-7 mol. % MgO; and 0-3 mol. % CaO.

A further exemplary glass composition suitable for forming hybrid glass laminates comprises: 60-70 mol. % $SiO_2$; 6-14 mol. % $Al_2O_3$; 0-15 mol. % $B_2O_3$; 0-15 mol. % $Li_2O$; 0-20 mol. % $Na_2O$; 0-10 mol. % $K_2O$; 0-8 mol. % MgO; 0-10 mol. % CaO; 0-5 mol. % $ZrO_2$; 0-1 mol. % $SnO_2$; 0-1 mol. % $CeO_2$; less than 50 ppm $As_2O_3$; and less than 50 ppm $Sb_2O_3$; where 12 mol. % $\leq (Li_2O+Na_2O+K_2O) \leq 20$ mol. % and 0 mol. % $\leq (MgO+CaO) \leq 10$ mol. %. A still further exemplary glass composition comprises: 63.5-66.5 mol. % $SiO_2$; 8-12 mol. % $Al_2O_3$; 0-3 mol. % $B_2O_3$; 0-5 mol. % $Li_2O$; 8-18 mol. % $Na_2O$; 0-5 mol. % $K_2O$; 1-7 mol. % MgO; 0-2.5 mol. % $Ca_o$; 0-3 mol. % $ZrO_2$; 0.05-0.25 mol. % $SnO_2$; 0.05-0.5 mol. % $CeO_2$; less than 50 ppm $As_2O_3$; and less than 50 ppm $Sb_2O_3$; where 14 mol. % $\leq (Li_2O+Na_2O+K_2O) \leq 18$ mol. % and 2 mol. % $\leq (MgO+CaO) \leq 7$ mol. %.

In a particular embodiment, an alkali aluminosilicate glass comprises alumina, at least one alkali metal and, in some embodiments, greater than 50 mol. % $SiO_2$, in other embodiments at least 58 mol. % $SiO_2$, and in still other embodiments at least 60 mol. % $SiO_2$, wherein the ratio $$\frac{Al_2O_3 + B_2O_3}{\sum \text{modifiers}} > 1,$$

where in the ratio the components are expressed in mol. % and the modifiers are alkali metal oxides. This glass, in particular embodiments, comprises, consists essentially of, or consists of: 58-72 mol. % $SiO_2$; 9-17 mol. % $Al_2O_3$; 2-12 mol. % $B_2O_3$; 8-16 mol. % $Na_2O$; and 0-4 mol. % $K_2O$, wherein the ratio $$\frac{Al_2O_3 + B_2O_3}{\sum \text{modifiers}} > 1.$$

In another embodiment, an alkali aluminosilicate glass comprises, consists essentially of, or consists of: 61-75 mol. % $SiO_2$; 7-15 mol. % $Al_2O_3$; 0-12 mol. % $B_2O_3$; 9-21 mol. % $Na_2O$; 0-4 mol. % $K_2O$; 0-7 mol. % $MgO$; and 0-3 mol. % $CaO$. In yet another embodiment, an alkali aluminosilicate glass substrate comprises, consists essentially of, or consists of: 60-70 mol. % $SiO_2$; 6-14 mol. % $Al_2O_3$; 0-15 mol. % $B_2O_3$; 0-15 mol. % $Li_2O$; 0-20 mol. % $Na_2O$; 0-10 mol. % $K_2O$; 0-8 mol. % $MgO$; 0-10 mol. % $CaO$; 0-5 mol. % $ZrO_2$; 0-1 mol. % $SnO_2$; 0-1 mol. % $CeO_2$; less than 50 ppm $As_2O_3$; and less than 50 ppm $Sb_2O_3$; wherein 12 mol. %$\leq Li_2O+Na_2O+K_2O \leq 20$ mol. % and 0 mol. %$\leq MgO+CaO \leq 10$ mol. %. In still another embodiment, an alkali aluminosilicate glass comprises, consists essentially of, or consists of: 64-68 mol. % $SiO_2$; 12-16 mol. % $Na_2O$; 8-12 mol. % $Al_2O_3$; 0-3 mol. % $B_2O_3$; 2-5 mol. % $K_2O$; 4-6 mol. % $MgO$; and 0-5 mol. % $CaO$, wherein: 66 mol. %$\leq SiO_2+B_2O_3+CaO \leq 69$ mol. %; $Na_2O+K_2O+B_2O_3+MgO+CaO+SrO > 10$ mol. %; 5 mol. %$\leq MgO+CaO+SrO \leq 8$ mol. %; $(Na_2O+B_2O_3)-Al_2O_3 \leq 2$ mol. %; 2 mol. %$\leq Na_2O-Al_2O_3 \leq 6$ mol. %; and 4 mol. %$\leq (Na_2O+K_2O)-Al_2O_3 \leq 10$ mol. %.

Exemplary chemically-strengthened as well as non-chemically-strengthened glass, in some embodiments, can be batched with 0-2 mol. % of at least one fining agent selected from a group that includes $Na_2SO_4$, NaCl, NaF, NaBr, $K_2SO_4$, KCl, KF, KBr, and $SnO_2$. In one exemplary embodiment, sodium ions in exemplary chemically-strengthened glass can be replaced by potassium ions from the molten bath, though other alkali metal ions having a larger atomic radii, such as rubidium or cesium, can replace smaller alkali metal ions in the glass. According to particular embodiments, smaller alkali metal ions in the glass can be replaced by $Ag^+$ ions. Similarly, other alkali metal salts such as, but not limited to, sulfates, halides, and the like may be used in the ion exchange process. The replacement of smaller ions by larger ions at a temperature below that at which the glass network can relax produces a distribution of ions across the surface of the glass that results in a stress profile. The larger volume of the incoming ion produces a compressive stress (CS) on the surface and tension (central tension, or CT) in the center of the glass. The compressive stress is related to the central tension by the following relationship:

$$CS = CT\left(\frac{t-2DOL}{DOL}\right)$$

where t represents the total thickness of the glass sheet and DOL is the depth of exchange, also referred to as depth of layer.

According to various embodiments, glass sheets and/or glass laminate structures comprising ion-exchanged glass can possess an array of desired properties, including low weight, high impact resistance, and improved sound attenuation. In one embodiment, a chemically-strengthened glass sheet can have a surface compressive stress of at least 250 MPa, e.g., at least 250, 300, 400, 450, 500, 550, 600, 650, 700, 750 or 800 MPa, a depth of layer at least about 20 μm (e.g., at least about 20, 25, 30, 35, 40, 45, or 50 μm) and/or a central tension greater than 40 MPa (e.g., greater than 40, 45, or 50 MPa) but less than 100 MPa (e.g., less than 100, 95, 90, 85, 80, 75, 70, 65, 60, or 55 MPa). A modulus of elasticity of a chemically-strengthened glass sheet can range from about 60 GPa to 85 GPa (e.g., 60, 65, 70, 75, 80 or 85 GPa). The modulus of elasticity of the glass sheet(s) and the polymer interlayer can affect both the mechanical properties (e.g., deflection and strength) and the acoustic performance (e.g., transmission loss) of the resulting glass laminate.

Exemplary glass sheet forming methods include fusion draw and slot draw processes, which are each examples of a down-draw process, as well as float processes. These methods can be used to form both chemically-strengthened and non-chemically-strengthened glass sheets. The fusion draw process generally uses a drawing tank that has a channel for accepting molten glass raw material. The channel has weirs that are open at the top along the length of the channel on both sides of the channel. When the channel fills with molten material, the molten glass overflows the weirs. Due to gravity, the molten glass flows down the outside surfaces of the drawing tank. These outside surfaces extend down and inwardly so that they join at an edge below the drawing tank. The two flowing glass surfaces join at this edge to fuse and form a single flowing sheet. The fusion draw method offers the advantage that, because the two glass films flowing over the channel fuse together, neither outside surface of the resulting glass sheet comes in contact with any part of the apparatus. Thus, the surface properties of the fusion drawn glass sheet are not affected by such contact.

The slot draw method is distinct from the fusion draw method. Here the molten raw material glass is provided to a drawing tank. The bottom of the drawing tank has an open slot with a nozzle that extends the length of the slot. The molten glass flows through the slot/nozzle and is drawn downward as a continuous sheet and into an annealing region. The slot draw process can provide a thinner sheet than the fusion draw process because a single sheet is drawn through the slot, rather than two sheets being fused together.

Down-draw processes produce glass sheets having a uniform thickness that possess surfaces that are relatively pristine. Because the strength of the glass surface is controlled by the amount and size of surface flaws, a pristine surface that has had minimal contact has a higher initial strength. When this high strength glass is then chemically strengthened, the resultant strength can be higher than that of a surface that has been a lapped and polished. Down-drawn glass may be drawn to a thickness of less than about 2 mm. In addition, down drawn glass has a very flat, smooth surface that can be used in its final application without costly grinding and polishing.

In the float glass method, a sheet of glass that may be characterized by smooth surfaces and uniform thickness is made by floating molten glass on a bed of molten metal, typically tin. In an exemplary process, molten glass that is fed onto the surface of the molten tin bed forms a floating ribbon. As the glass ribbon flows along the tin bath, the temperature is gradually decreased until a solid glass sheet can be lifted from the tin onto rollers. Once off the bath, the glass sheet can be cooled further and annealed to reduce internal stress.

As noted above, exemplary glass sheets can be used to form glass laminates or glass laminate structures. The term "thin" as used herein means a thickness of up to about 1.5 mm, up to about 1.0 mm, up to about 0.7 mm, or in a range of from about 0.5 mm to about 1.0 mm, or from about 0.5 mm to about 0.7 mm. The terms "sheet", "structure", "glass structures", "laminate structures" and "glass laminate structures" may be used interchangeably in the present disclosure and such use should not limit the scope of the claims appended herewith. As defined herein, a glass laminate can also comprise an externally or internally-facing chemically-strengthened glass sheet, an internally or externally facing non-chemically-strengthened glass sheet, and a polymer interlayer formed between the glass sheets. The polymer interlayer can comprise a monolithic polymer sheet, a multilayer polymer sheet, or a composite polymer sheet. The polymer interlayer can be, for example, a plasticized poly (vinyl butyral) sheet.

Figure 1A:
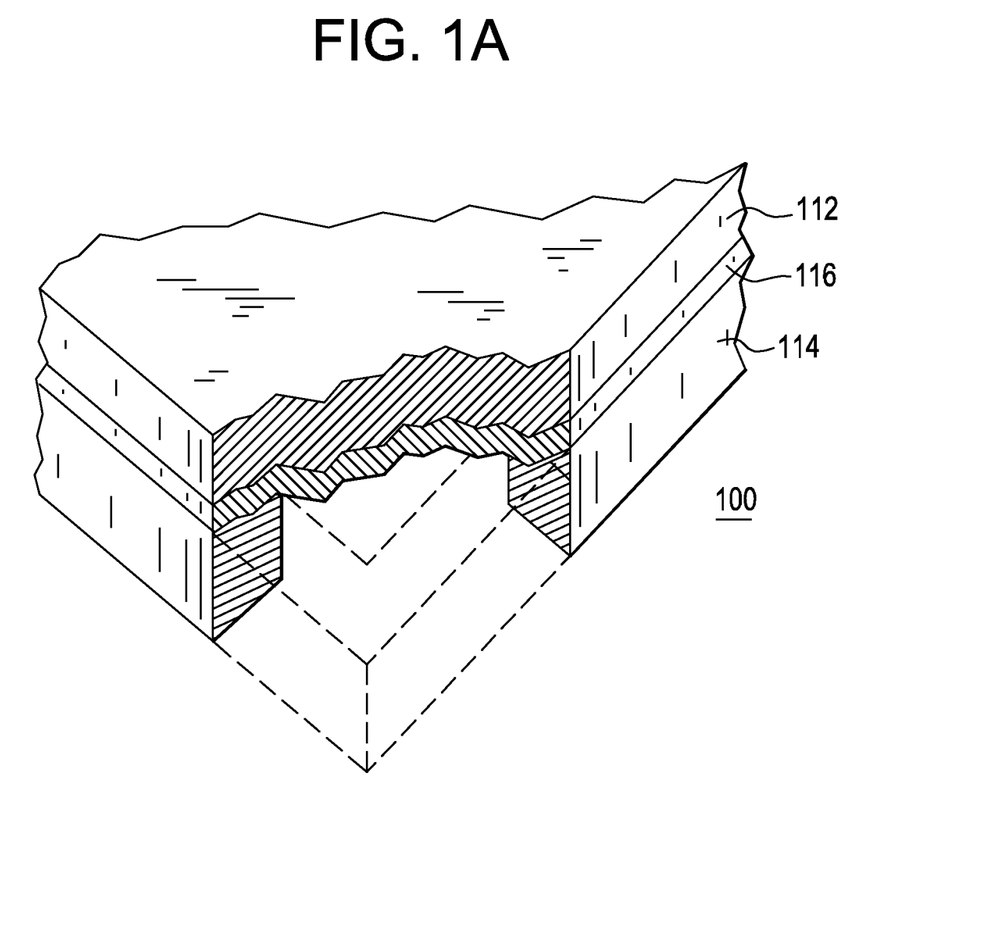
FIGS. 1A, 1B and 1C are perspective cut-away illustrations of embodiment of the present disclosure.
Figure 1B:
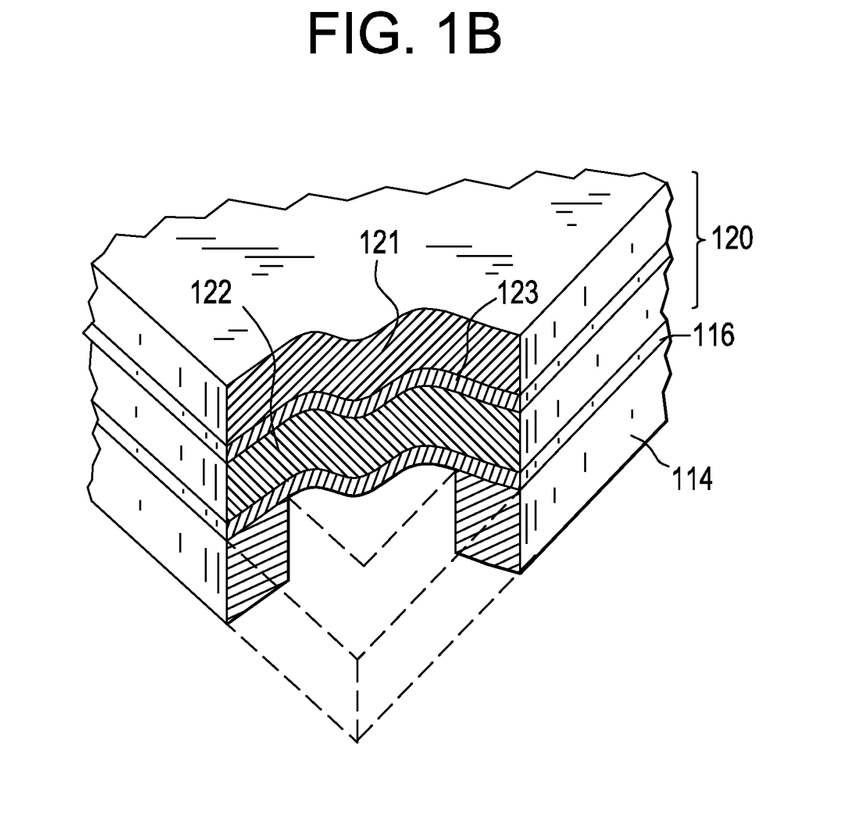
Figure 1C:
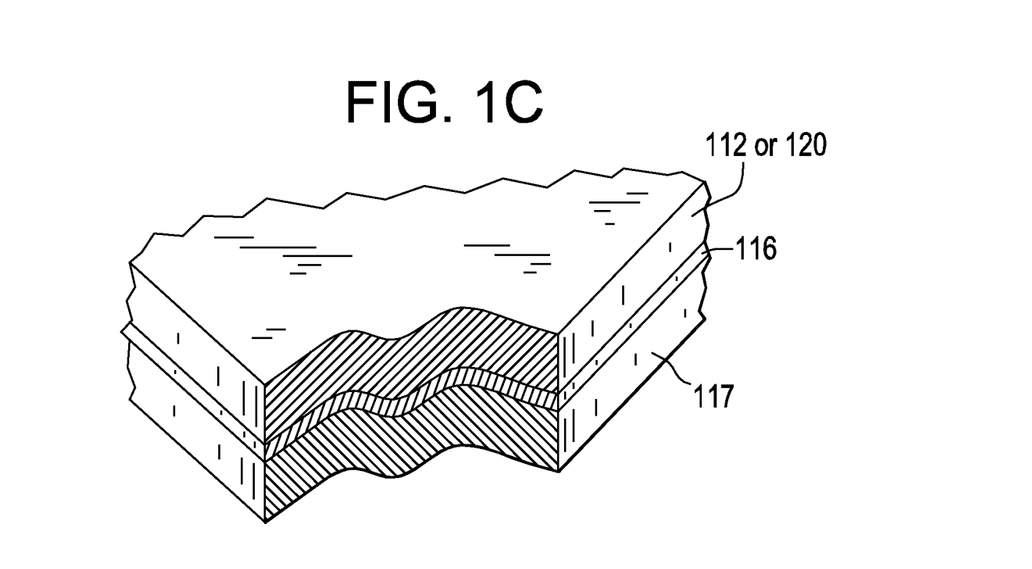

FIGS. 1A, 1B and 1C are perspective cut-away illustrations of embodiments of the present disclosure. With reference to FIG. 1A, an exemplary modular glass panel 100 includes a single, thin light-weight sheet of chemically-strengthened glass 112, e.g., Gorilla® Glass, mounted to a backing frame 114 by an adhesive material 116. Of course, exemplary sheets of glass 112 can be formed from any suitable chemically-strengthened glass, thermal tempered glass, heat strengthened glass, annealed glass, soda lime glass, or glass ceramic, just to name a few. Additionally, embodiments of the present disclosure can employ exemplary polymers or plastics in the place of glass sheets. Exemplary polymeric materials include, but are not limited to, polyvinyl butryal (PVB), ethylene vinyl acetate (EVA), SentryGlass® or other ionomers, polycarbonate, acrylic, and the like. Exemplary glass or polymeric panels can be suitable for a myriad of interior or exterior environments such as, but not limited to, elevators, walls, standalone walls (as in partitions), office spaces, lab spaces, entry ways, and the like. While FIG. 1A illustrates a single sheet of material or glass 112, embodiments of the present disclosure should not be so limited as a multi-layer structure 120 can also be mounted onto a suitable backing frame 114 as illustrated in FIG. 1B. Of course, exemplary backing frames can also be solid backing frames 117 as illustrated in FIG. 1C.

An exemplary, non-limiting backing frame or structure 114, 117 can be constructed of a piece or multiple pieces of material having a modulus of elasticity >2 GPa and a thickness greater than 3 mm. Exemplary backer materials include, but are not limited to, polyvinyl chloride (PVC), polycarbonate, phenolic materials (e.g., Trespa and the like), steel, wood, aluminum, glasses (e.g., soda lime glass and the like), ceramics, other metals, etc. These backer materials can be in the form of a frame as in FIGS. 1A and 1B and can be in the form of a substantially solid backing device as in FIG. 1C. In alternative embodiments, the backing frame (as in FIGS. 1A and 1B) or the solid backing device (as in FIG. 1C) can be in the form of a honeycomb or has a honeycomb structure. Exemplary materials for the honeycomb backer can be, but is not limited to, aluminum, steel, ceramic, polymer, graphite, carbon, and combinations thereof.

With continued reference to FIG. 1B, the multilayer structure 120 can include one thin glass sheet 121 and a second glass sheet 122 having a polymer interlayer 123 therebetween. Exemplary glass sheets 121, 122 can be formed from any suitable chemically-strengthened glass, thermal tempered glass, heat strengthened glass, annealed glass, soda lime glass, and glass ceramics, just to name a few. In some embodiments, the first or external glass sheet 121 can be chemically strengthened glass and the second or interior glass sheet 122 can be non-chemically strengthened. Of course, embodiments of the present disclosure can employ exemplary polymers or plastics in the place of the glass sheets. Exemplary polymeric materials include, but are not limited to, polyvinyl butryal (PVB), ethylene vinyl acetate (EVA), SentryGlass® or other isomers, polycarbonate, acrylic, and the like. Exemplary embodiments depicted in FIGS. 1A-1C can include chemically strengthened glass sheets or glass laminate structures bonded with one or more layers of an anti-splinter, adhesive film 116 to the backing frame 114 or full backing structure 117. Additional glasses, coatings, and/or glass ceramics can be employed in embodiments of the present disclosure to provide a variety of optical characteristics such as, but not limited to, varying transparency characteristics (e.g., active devices such as, but not limited to, electrochromic and passive control such as photo or thermochromic control with heat and/or wavelength tuned control of transparency), anti-glare characteristics, anti-reflection characteristics, structural characteristics (embossments, inclusions, cold or hot formed structures), mirrored surfaces, electrical circuitry (printing or deposition of circuitry by screen printing, ink jet printing, ITO, vapor deposition and the like) for transparent displays and electroluminescent displays. In some embodiments, the film layer 116 can include a plurality of decorative layers. Such decorative layers can be painted, ink jetted, or otherwise deposited directly on the glass sheet or glass laminate structure, deposited on a vinyl layer (either cast or calendered, with or without embossments in the adhesive layer for pathways of air escape during lamination), deposited on PVB such as Sentry Glass Expressions or other printable PVB, or deposited on other types of interlayers and films such as EVA, thermoplastic polyurethane (TPU), and polyethylene terephthalate (PET), to name a few, with or without embossments in the adhesive layer for pathways of air escape during lamination. Of course, the interlayer could also express the same or similar optical attributes as stated above.

Applicant conducted ball drop on embodiments of the present disclosure described above and conducted use case testing with metal hand trucks and pallet jacks impacting into exemplary modular glass panels of the present disclosure. Each of Applicant's embodiments surpassed numerous ANSI test requirements (ANSI Impact, ANSI indoor aging, deflection, E84 and 16 CFR Impact).

Figure 2A:
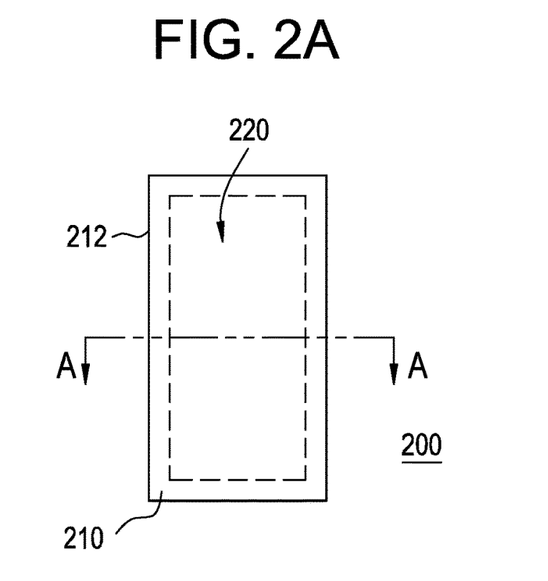
FIG. 2A is a top plan view of another embodiment of the present disclosure.
Figure 2B:
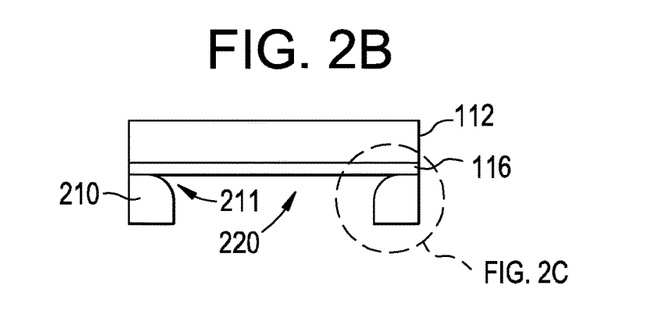
FIG. 2B is a cross-sectional view of the embodiment of FIG. 2A along line A-A.
Figure 2C:
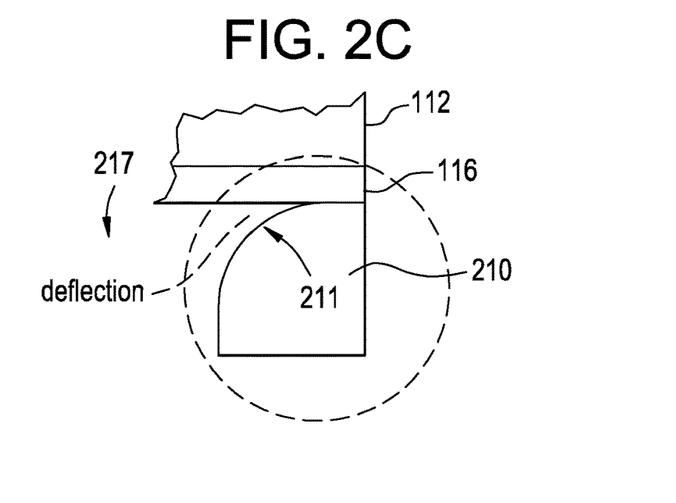
FIG. 2C is a detailed view of FIG. 2B.

FIG. 2A is a top plan view of another embodiment of the present disclosure. FIG. 2B is a cross-sectional view of the embodiment of FIG. 2A along line A-A. FIG. 2C is a detailed view of FIG. 2B. With reference to FIGS. 2A-2C, an exemplary modular glass panel 200 can include one or more glass sheets or glass laminate structures as described above. While the modular glass panel 200 is illustrated in rectangular form, the claims appended herewith should not be so limited as exemplary modular glass panels 200 can be any geometric form such as, but not limited to, circular, oval, square, hexagonal, trapezoidal, etc. Additionally, it is envisioned that any glass panel shape, whether symmetrical or asymmetrical, can be cut and formed as appropriate and an exemplary backing panel affixed thereto. The modular glass panel 200 in this non-limiting embodiment can provide a backing frame 210 extending along the perimeter 212 of the glass panel. In some embodiments, backing frame 210 can fully frame or enclose the edges of the glass sheet 112 or laminate structure or, in other embodiments, can leave the edges thereof exposed whereby the edges of the glass sheet 112 or laminate structure overhang the backing frame 210 or are set back or flush with the edge of the backing frame 210. In a preferred embodiment, the glass sheet 112 or laminate structure is substantially flush or set back from the backing frame 210 edge.

In additional embodiments of the present disclosure, the glass sheet 112 or laminate structure can be rendered to a safety glass. For example, exemplary glass sheets can be made as a safety glass by employing a suitable bonding polymer (e.g., a variety of 3M Safety Films are made for this purpose) on the rear or back side of the glass sheet. It also follows that laminated glass structures, e.g., glass-to-glass sheets or glass sheet to polymeric material to glass sheet are also examples of safety glasses. Exemplary, non-limiting constructions of glass paneling or laminate structure paneling include a glass/interlayer/glass construction with the interlayer comprising PVB, EVA, Sentry Glass, PET, or another energy absorbing or dispersing polymer. Such an embodiment has been experimentally tested and surpassed ANSI test requirements for resistance against impact and for retaining broken glass pieces when the respective panel was finally fractured. Such exemplary constructions can also accommodate any decorative and/or lighting qualities of the panel on a solid or framed backing device. In some exemplary embodiments having a backing frame, the space or area 220 defined or encompassed by the perimeter frame 210 permits the use of the glass or laminate panel as a speaker, receiver, microphone, and the like, whereby the acoustic actuators can be adhered to the interior of the glass panel and the respective acoustic components, e.g., amplifiers, transducers, and the like, contained within the encompassed area 220. Additionally, the glass or laminate panel can be utilized as a cover glass for touch screen devices mounted directly to the glass or glass laminate panel and substantially contained in the encompassed area 220. In further embodiments of the present disclosure, lighting devices and components such as, but not limited to, light emitting diodes (LEDs), arrays of LEDs, and other luminaires can be substantially contained in the encompassed area 220 whereby the light given therefrom is emitted through the glass or glass laminate panel. For example, in one embodiment, separate LED panels can be placed behind a glass panel (which may not be transparent but employs diffuse mechanisms (e.g., anti-glare coating on one or both sides of the panel, etched (dipped, sprayed, deposited)) or other structured light qualities incorporating a variety known decorative designs). In another embodiment, LED strips or individual LEDs can be positioned around the perimeter of an exemplary panel to use the glass or laminate structure as a waveguide, dispersing light such that the glass panel glows. Thus, in such embodiments, portions or all of the glass or glass laminate panel can include diffusing mechanisms including coatings or the like to diffuse or otherwise alter incident light on one side of the glass or glass laminate panel thereby providing an altered or diffused refracted light.

In some of these embodiments, the intensity of emitted light can be controlled by several mechanisms such as, but not limited to, dimmers, manual variable controls, voice, motion or heat activated controls (or other automated, computer controlled, manually controlled mechanisms) to reduce heat produced by radiant energy. To reduce or eliminate lighting "hot spots" (areas where people perceive the light source) and create a uniform lighting, the glass or laminate material can be etched to create a diffuse surface. For example, opal glass can be employed to produce uniform lighting for microscopy or photography or holography. Other means of creating uniform lighting through the use of holographic diffusers, chemical etchants, sand or bead blasting glass can also be employed in embodiments of the present disclosure. Diffusers can also be engineered to deliver or convert almost any type of diffusion profile from non-uniform output light sources such as LEDs. One exemplary non-limiting engineered diffuser includes a variable diffuser manufactured by Luminit, LLC. Exemplary diffusion profiles can range from narrow line to a broad Lambertian profile to homogenize non-uniform light emitted from many sources, including LEDs. Holographic, etched, and opal glass diffusers are generally available from such sources as Edmund Optics. Engineered diffusers are obtainable from RPC, Inc. In one embodiment, a diffusing panel can be placed between an LED panel contained in an encompassed area 220 and one of the glass panels affixed thereto by optically clear adhesives. In another embodiment, a diffuser element can be a part of the glass used in the panel. Diffusers so employed can thus be designed to modify lighting conditions across an exemplary panel to create unique patterns for decorative and/or functional lighting displays. Thus, in some embodiments the glass or glass laminate panel can also include a variety of materials selected for their unique properties in creating a lightweight, strong, visually appealing and user interactive panel.

In further embodiments, the front surface of the glass or glass laminate panel can provide a variety of attributes for aesthetics, safety, and user interaction. For example, the glass surface can include anti-glare, anti-reflection, anti-fingerprint, anti-viral, anti-bacterial or other coatings produced by mechanical or chemical means.

Figure 3A:
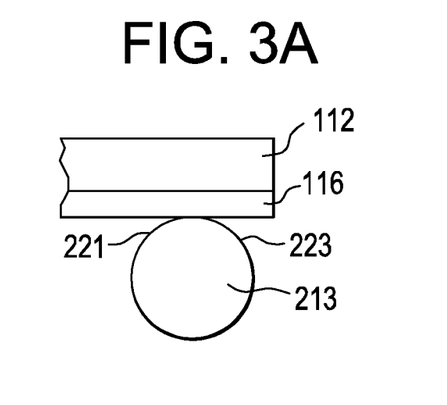
FIGS. 3A and 3B are detailed views, similar to FIG. 2C, of further embodiments of the present disclosure.
Figure 3B:
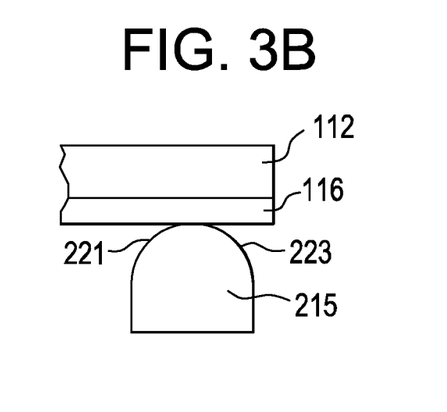

With continued reference to FIGS. 2B and 2C, an exemplary backing frame 210 can include a substantially rectangular or square cross section wherein an interior edge 211 thereof is rounded in form. This rounded edge 211 can accommodate any flexure, deflection or bending 217 of the glass or glass laminate panel and does not provide a sharp edge as would otherwise be present with a fully rectangular or square cross section. FIGS. 3A and 3B are detailed views, similar to FIG. 2C, of further embodiments of the present disclosure whereby the backing frame includes a circular 213 or domed 215 cross section. Again, in each of these embodiments, an interior edge 221 and in some cases exterior edge 223 presents a rounded form to prevent a sharp edge from contacting the adjacent glass panel or glass laminate structure. Of course, while the cross sectional geometries have been illustrated as rectangular or square (FIGS. 2B, 2C) with a rounded edge, or circular (FIG. 3A), or domed (FIG. 3B), the claims appended herewith should not be so limited as the cross section can be any number of geometries, e.g., oval, hexagonal, trapezoidal, asymmetrical, etc., so long as the edges of such geometric form are rounded on the interior edge of the backing frame. Of course, while the embodiments of the present disclosure have been illustrated as having a single glass sheet 112 adhered to a backing frame with an adhesive layer 116, the claims appended herewith should not be so limited as exemplary embodiments can include multilayer glass laminate structures described herein and illustrated in FIG. 1B. In embodiments of the present disclosure where the glass panel is not flush to the backing frame, both edges, the interior edge and exterior edge would present a rounded edge to the adjacent glass panel or laminate structure to prevent a sharp profile thereto. Additionally, while the cross-sectional illustrations are shown as solid core frame embodiments, it is envisioned that the frames can be hollow in nature thereby further reducing the weight of an exemplary modular panel. Thus, the claims appended herewith should not be so limited to a solid frame core. As noted above, embodiments of the present disclosure can employ a full backing device or a hollow- or solid-core backing frame with single or plural glass sheets of about 0.5 mm to 2 mm thickness. Such backing devices or frames can thus allow panelization of the glass or laminate board without the need for point supported hardware; however, embodiments of the present disclosure can also be point supported using a variety of common hardware options such as spider clamps and the like (preferably non-penetrating, but through-holes are also envisioned).

Figure 4:
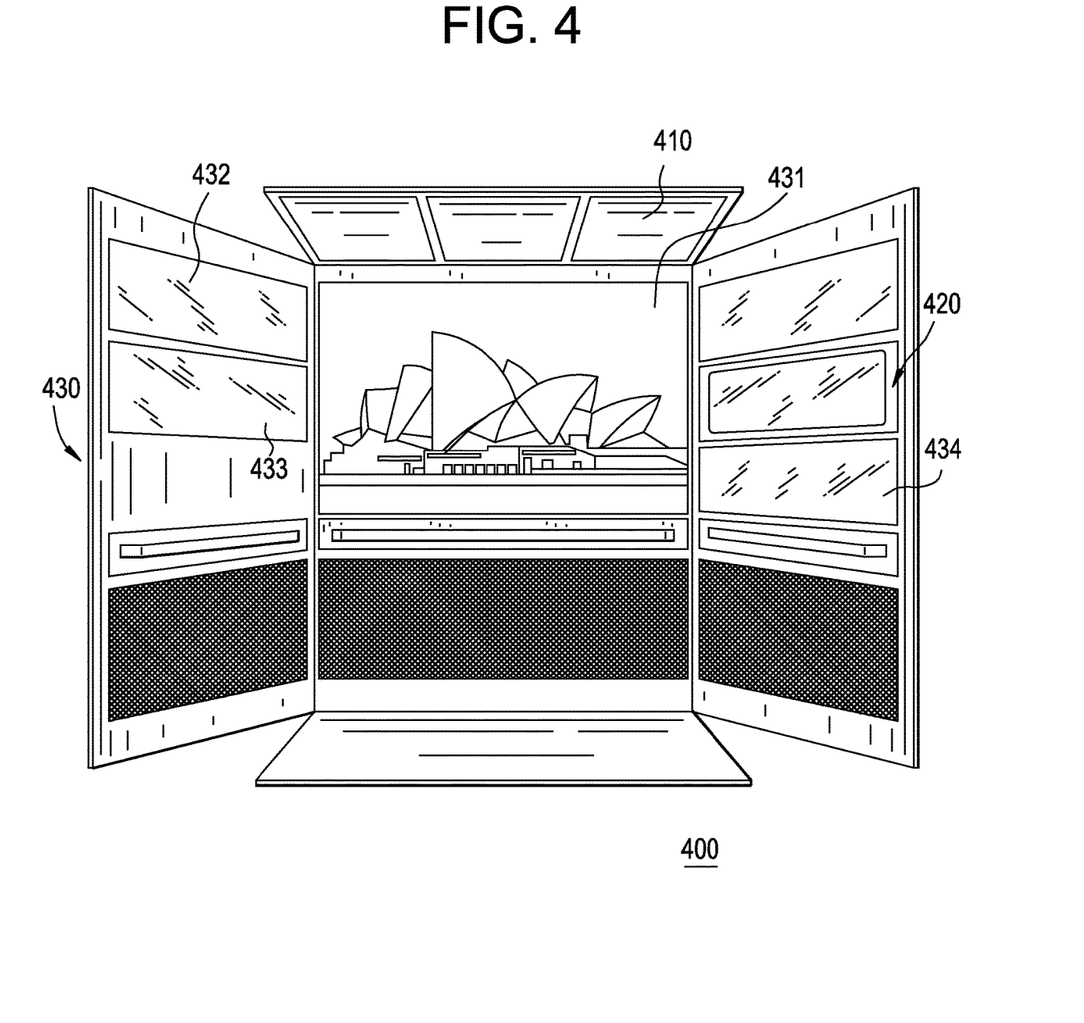
FIG. 4 is an illustration of some embodiments of the present disclosure.

FIG. 4 is an illustration of some embodiments of the present disclosure. With reference to FIG. 4, a series of planar surfaces 400 is presented having embodiments of the present disclosure mounted thereon. In some embodiments, these planar surfaces 400 can form one or more walls and/or a ceiling in an elevator cab. In other embodiments, these planar surfaces 400 can form walls or other surfaces in a lobby, room or other interior or exterior environment. More specifically, FIG. 4 provides an exemplary system of panels incorporating high resolution mural graphics, diffuse lighting panels (ceiling or wall), solid colors, wood and steel vignettes, touch screen information devices, and panels that can operate as speakers or microphones and/or include wireless or wired control of lighting, sound systems, interactive videos, and data transfer (e.g., Bluetooth) to hand held devices. For example, the Corning ONE Wireless platform can be utilized with embodiments of the present disclosure and can be integrated in the cavity or encompassed area 220 of some embodiments or can be situated in other portions of exemplary embodiments. Of course, other distributed wireless or antenna systems can be employed to gather and/or disseminate information to devices within a space or exterior to a space such as handheld devices, smartphones and the like for purposes of freely sharing information (information way points) or as points of sale (POS). Additionally, wireless sensor networks (WSN) for environmental monitoring feedback and control, can also be employed with embodiments of the present disclosure. It should be noted that the depiction of the planar surfaces 400 in a confined area should not limit the scope of the claims appended herewith. As depicted in FIG. 4, modular glass panels according to embodiments of the present disclosure can be employed along vertical, horizontal or other planar surfaces of a structure. One embodiment as heretofore described can be employed in the ceilings 410 of an interior or exterior structure such as, but not limited to, an elevator cab, as a light illuminating structure having LEDs, arrays of LEDs, light emitting fibers, lasers, or other luminaires or light emitting devices contained in an encompassed area defined by an exemplary backing frame. Other embodiments can be employed in ceilings or side panels 420 with displays or active displays contained in an encompassed area defined by an exemplary backing frame. Such an embodiment 420 can fully utilize the touch concept advantages of thin glass as heretofore described. Thus, exemplary embodiments can also include displays (passive and/or active) and interactive transparent displays. Interactivity can be achievable through touch, voice, and/or personal mobile (electronic or photonic) devices. Exemplary non-limiting materials for cover glass can also include electrochromic and photochromic glass (e.g., dynamic or smart glass) for transparency and reflectance control. Additional embodiments can be employed in side panels 430 having decorative features (e.g., pictures 431, marbling 432, solid colors 433, wood 434, and the like). Of course, in these embodiments, the decoration can be ink jetted or otherwise deposited on an interior face of the respective panel or can be a portion of or all of the respective backing frame. It should be noted that the thinness and high transparency of embodiments of the present disclosure permit an image that is printed on the back surface to be seen as being directly on the surface of the front face of the glass. Apparent depth of decorative layers can thus be controlled by adding layers to the thickness of the decorative stack. Layers added by single or multiple lamination steps of two or more pieces of glass, plastic, interlayers, and decorative element are envisioned in embodiments of the present disclosure.

Exemplary backing frames according to embodiments of the present disclosure can employ and accommodate any means of fixation to walls, elevator cabs, or other architectural structures including, but not limited to, removable and reconfigurable partitions for office spaces, lobbies, hallways, entryways, etc. Some of the non-limiting examples of such fixation mechanisms are tongue in groove type designs, clip designs, point bonding to glass such as the Guardian® spider fixtures, corner frame mortices, tapes, films and other adhesives (such as VHB series or the OCA series from 3M, TESA, Dow-Corning adhesives, Sika adhesives, or removable adhesives such as 3M quick release products) for direct bonding of the glass or glass laminate panel to existing walls or frames. Such connection and fixation mechanisms can also be employed to attach periphery and enabling technologies to exemplary embodiments of a glass or glass laminate panel.

Embodiments of the present disclosure are generally modular in design thus allowing for ease of replacement of panels should a panel fracture or be replaced due to aesthetic purposes. For example, changing an exemplary panel of solid color to one that is a touch display of the same dimensions can minimize rework/refitting on site due to the construction of such embodiments, thus panel installation can be agnostic towards panel functionality. For embodiments requiring added stiffness, an exemplary panel construction can be made of multiple thin glass layers or a hybrid construction of thin chemically strengthened glass and thicker soda lime glass (annealed, heat strengthened, thermally tempered). Such a laminate construction can retain the strength, hardness and optical clarity of thin, chemically-strengthened glass (e.g., Gorilla® Glass) while still maintaining a lighter weight advantage over all conventional soda lime glass constructions.

While not shown, some embodiments of the present disclosure can include additional impact absorbing mechanisms such as, but not limited to, grommets and absorption pads (e.g., rubbers, silicones, elastic polymers, viscoelastic materials, and the like). These absorption mechanisms or pads can be positioned at supports and other impact absorbing points of contact improve the break resistance of the panel system. Sorbothane, polynorbornene, noene, astrosorb, memory foam, and neoprene are some but not all examples of viscoelastic materials. Shear thickening materials in which viscosity increases with the rate of shear strain may also be used at strategic points to stiffen the structure during impact events.

One exemplary embodiment of the present disclosure provides a modular glass panel having a glass structure having at least one thin glass sheet with a thickness ranging from about 0.5 mm to about 2.0 mm, a backing frame positioned adjacent the glass structure and situated along the perimeter of the glass structure, and a polymer layer intermediate the glass structure and backing frame to adhere the glass structure together with the backing frame. In some embodiments, the thickness of the at least one thin glass sheet ranges from about 0.5 to 1.5 mm, from 0.5 mm to about 1.0 mm or from about 0.5 mm to about 0.7 mm. In other embodiments, the glass structure further comprises the at least one thin glass sheet and a second glass sheet having a polymer interlayer therebetween. This thin glass sheet can be a thin, chemically-strengthened glass sheet. In other embodiments, the second glass sheet can be, but is not limited to, a chemically-strengthened glass sheet, a thin chemically-strengthened glass sheet, a soda lime glass sheet, and a monolithic tempered glass sheet. Either the second glass sheet or the at least one thin glass sheet can be adjacent the backing frame. Exemplary polymer interlayers can be, but are not limited to, PVB, EVA, TPU, PET, and combinations thereof. In additional embodiments, exemplary backing frames can possess a cross-section such as, but not limited to, a substantially rectangular cross-section with a rounded interior edge adjacent the glass structure, a substantially square cross-section with a rounded interior edge adjacent the glass structure, a circular cross-section, a domed cross section, a substantially rectangular cross-section with rounded interior and exterior edges adjacent the glass structure, a substantially square cross-section with rounded interior and exterior edges adjacent the glass structure, asymmetrical cross-sections, and symmetrical cross-sections. It is also envisioned that exemplary modular glass panels further comprise a plurality of decorative film layers and can also include one or more coatings of material such as, but not limited to, an anti-glare material, anti-reflection material, anti-fingerprint material, anti-viral material, anti-bacterial material, anti-splinter material, and combinations thereof, provided on one or both planar surfaces of the glass structure. In some embodiments, the backing frame can define a space containing a device selected from the group consisting of a light source, a LED, an array of LEDs, a laser, a light emitting fiber, a luminaire, a speaker, a microphone, a display, electronic devices, and combinations thereof. Such exemplary modular glass panels can be installed as a planar surface in an interior environment selected from the group consisting of a wall, an elevator cab, a lobby, a ceiling, a hallway, an entryway, and a room. In additional embodiments, the backing frame can be comprised of a material such as, but not limited to, polyvinyl chloride, polycarbonate, glasses, phenolic material, steel, wood, aluminum, ceramics and combinations thereof.

Another exemplary embodiment of the present disclosure provides a modular panel comprising a planar structure, a backing frame positioned adjacent the planar structure and situated along the perimeter of the planar structure, the backing frame have a geometric cross-section with a rounded interior edge adjacent the planar structure to prevent breakage of the planar structure upon loading or impact of an exterior surface of the planar structure, and a polymer layer intermediate the planar structure and backing frame to adhere the planar structure together with the backing frame. Exemplary planar structures can be, but are not limited to, a thin glass sheet, a polymeric material, and a multi-layer laminate structure, and combinations thereof. Exemplary thin glass sheets can have a thickness ranging from about 0.5 to 2.0 mm, from about 0.5 to 1.5 mm, from about 0.5 mm to about 1.0 mm or from about 0.5 mm to about 0.7 mm. If the embodiment employs a multi-layer laminate structure, this structure can include at least one thin glass sheet and a second glass sheet having a polymer interlayer therebetween. In any embodiment, the thin glass sheet can be a thin, chemically-strengthened glass sheet. In some embodiments, the second glass sheet can be, but is not limited to, a chemically-strengthened glass sheet, a thin chemically-strengthened glass sheet, a soda lime glass sheet, and a monolithic tempered glass sheet. In multilayer embodiments, the polymer interlayer can be but is not limited to, PVB, EVA, TPU, PET, and combinations thereof. Exemplary geometric cross-sections can be, but are not limited to a substantially rectangular cross-section with a rounded interior edge adjacent the glass structure, a substantially square cross-section with a rounded interior edge adjacent the glass structure, a circular cross-section, a domed cross section, a substantially rectangular cross-section with rounded interior and exterior edges adjacent the glass structure, a substantially square cross-section with rounded interior and exterior edges adjacent the glass structure, asymmetrical cross-sections, symmetrical cross-sections. It is also envisioned that exemplary modular panels further comprise a plurality of decorative film layers and can also include one or more coatings of material such as, but not limited to, an anti-glare material, anti-reflection material, anti-fingerprint material, anti-viral material, anti-bacterial material, anti-splinter material, and combinations thereof, provided on one or both planar surfaces of the planar structure. In some embodiments, the backing frame can define a space containing a device selected from the group consisting of a light source, a LED, a light emitting fiber, a laser, an array of LEDs, a luminaire, a speaker, a microphone, a display, electronic devices, and combinations thereof. Such exemplary modular panels can be installed as a planar surface in an interior environment selected from the group consisting of a wall, an elevator cab, a lobby, a ceiling, a hallway, an entryway, and a room. In additional embodiments, the backing frame can be comprised of a material such as, but not limited to, polyvinyl chloride, polycarbonate, phenolic materials, glasses, steel, wood, aluminum, ceramics and combinations thereof.

It is thus an aspect of embodiments of the present disclosure to provide reconfigurable panels having lighter weight (installation, handling, shipping, processing during decoration), greater optical transmission in the optical range (maintain color purity of decorations), greater flexibility for decorative designs, enabled touch functionality, speakers or speaker/microphone combinations, scratch resistance and impact resistance in comparison to conventional solutions.

While this description can include many specifics, these should not be construed as limitations on the scope thereof, but rather as descriptions of features that can be specific to particular embodiments. Certain features that have been heretofore described in the context of separate embodiments can also be implemented in combination in a single embodiment. Conversely, various features that are described in the context of a single embodiment can also be implemented in multiple embodiments separately or in any suitable subcombination. Moreover, although features can be described above as acting in certain combinations and can even be initially claimed as such, one or more features from a claimed combination can in some cases be excised from the combination, and the claimed combination can be directed to a subcombination or variation of a subcombination.

Similarly, while operations are depicted in the drawings or figures in a particular order, this should not be understood as requiring that such operations be performed in the particular order shown or in sequential order, or that all illustrated operations be performed, to achieve desirable results. In certain circumstances, multitasking and parallel processing can be advantageous.

As shown by the various configurations and embodiments illustrated in FIGS. 1-4, various embodiments for modular wall panels and planar structures have been described.

While preferred embodiments of the present disclosure have been described, it is to be understood that the embodiments described are illustrative only and that the scope of the invention is to be defined solely by the appended claims when accorded a full range of equivalence, many variations and modifications naturally occurring to those of skill in the art from a perusal hereof.

What is claimed is:

1. A modular glass panel comprising
a glass structure having a perimeter and comprising at least one strengthened glass sheet with a thickness ranging from about 0.5 mm to about 2.0 mm;
a backing frame positioned behind the glass structure and situated along the perimeter of the glass structure; and
a polymer layer intermediate the glass structure and the backing frame to adhere the glass structure together with the backing frame.

2. The modular glass panel of claim 1 wherein the at least one glass sheet has a thickness that ranges from about 0.5 mm to about 1.5 mm, from about 0.5 mm to about 1.0 mm or from about 0.5 mm to about 0.7 mm.

3. The modular glass panel of claim 1 wherein the glass structure further comprises the at least one glass sheet and a second glass sheet having a polymer interlayer therebetween.

4. The modular glass panel of claim 3 wherein the at least one glass sheet is a chemically-strengthened glass sheet.

5. The modular glass panel of claim 4 wherein the second glass sheet is selected from the group consisting of a chemically-strengthened glass sheet, a soda lime glass sheet, and a monolithic tempered glass sheet.

6. The modular glass panel of claim 5 wherein the at least one glass sheet is adjacent the backing frame.

7. The modular glass panel of claim 3 wherein the polymer interlayer is selected from the group consisting of polyvinyl butyral (PVB), ethylene vinyl acetate (EVA), thermoplastic polyurethane (TPU), polyethylene terephthalate (PET), and combinations thereof.

8. The modular glass panel of claim 1 wherein the backing frame has a cross-section selected from the group consisting of a substantially rectangular cross-section with a rounded interior edge adjacent the glass structure, a substantially square cross-section with a rounded interior edge adjacent the glass structure, a circular cross-section, a domed cross section, a substantially rectangular cross-section with rounded interior and exterior edges adjacent the glass structure, a substantially square cross-section with rounded interior and exterior edges adjacent the glass structure, asymmetrical cross-sections, symmetrical cross-sections.

9. The modular glass panel of claim 1 wherein the backing frame defines a space containing a device selected from the group consisting of a light source, a light emitting diode (LED), an array of LEDs, a luminaire, a speaker, a microphone, a light emitting fiber, a laser, a display, electronic devices, and combinations thereof.

10. The modular glass panel of claim 1 wherein the backing frame is comprised of a material selected from the group consisting of polyvinyl chloride, polycarbonate, phenolic material, steel, glass, wood, aluminum, ceramic and combinations thereof.

11. The modular glass panel of claim 1 wherein the backing frame includes a honeycomb structure comprising a material selected from the group consisting of aluminum, steel, ceramic, polymer, graphite, carbon, and combinations thereof.

12. A modular panel comprising
a planar structure having a perimeter;
a backing frame positioned behind the planar structure and situated along the perimeter of the planar structure, the backing frame have a geometric cross-section with a rounded interior edge adjacent the planar structure to prevent breakage of the planar structure upon loading or impact of an exterior surface of the planar structure; and
a polymer layer intermediate the planar structure and backing frame to adhere the planar structure together with the backing frame.

13. The modular panel of claim 12 wherein the planar structure is selected from the group consisting of a glass sheet, a polymeric material, and a multi-layer laminate structure.

14. The modular panel of claim 13, wherein the glass sheet has a thickness that ranges from about 0.5 mm to about 2.0 mm, from about 0.5 mm to about 1.5 mm or from about 0.5 mm to about 0.7 mm.

15. The modular panel of claim 13 wherein the multi-layer laminate structure further comprises the glass sheet and a second glass sheet having a polymer interlayer therebetween.

16. The modular panel of claim 15 wherein the glass sheet is a, chemically-strengthened glass sheet.

17. The modular panel of claim 15 wherein the second glass sheet is selected from the group consisting of a chemically-strengthened glass sheet, a soda lime glass sheet, and a monolithic tempered glass sheet.

18. The modular panel of claim 15 wherein the polymer interlayer is selected from the group consisting of polyvinyl butyral (PVB), ethylene vinyl acetate (EVA), thermoplastic polyurethane (TPU), polyethylene terephthalate (PET), and combinations thereof.

19. The modular panel of claim 12 wherein the geometric cross-section is selected from the group consisting of a substantially rectangular cross-section with a rounded interior edge adjacent the planar structure, a substantially square cross-section with a rounded interior edge adjacent the planar structure, a circular cross-section, a domed cross section, a substantially rectangular cross-section with rounded interior and exterior edges adjacent the planar structure, a substantially square cross-section with rounded interior and exterior edges adjacent the planar structure, asymmetrical cross-sections, symmetrical cross-sections.

20. The modular panel of claim 12 wherein the backing frame defines a space containing a device selected from the group consisting of a light source, a light emitting diode (LED), an array of LEDs, a light emitting fiber, a laser, a luminaire, a speaker, a microphone, a display, electronic devices, and combinations thereof.

* * * * *

UNITED STATES PATENT AND TRADEMARK OFFICE
CERTIFICATE OF CORRECTION

PATENT NO. : 10,773,495 B2
APPLICATION NO. : 15/994500
DATED : September 15, 2020
INVENTOR(S) : Gordon Charles Brown et al.

Page 1 of 1

It is certified that error appears in the above-identified patent and that said Letters Patent is hereby corrected as shown below:

In the Claims

In Column 16, Line 30, Claim 16, delete "a," and insert -- a --, therefor.

Signed and Sealed this
Twenty-fourth Day of November, 2020

Andrei Iancu
*Director of the United States Patent and Trademark Office*